(12) United States Patent
Franklin

(10) Patent No.: US 6,404,974 B1
(45) Date of Patent: Jun. 11, 2002

(54) METHOD AND APPARATUS FOR TREATING A VIDEO SIGNAL

(76) Inventor: Trevor Franklin, 95 Connemara Drive, Thornlie, W.A. 6108 (AU)

( * ) Notice: Subject to any disclaimer, the term of this patent is extended or adjusted under 35 U.S.C. 154(b) by 0 days.

(21) Appl. No.: 08/930,836

(22) PCT Filed: Apr. 4, 1996

(86) PCT No.: PCT/AU96/00193

§ 371 (c)(1), (2), (4) Date: May 4, 1998

(87) PCT Pub. No.: WO96/31878

PCT Pub. Date: Oct. 10, 1996

(30) Foreign Application Priority Data

| Apr. 7, 1995 | (AU) | ............................................... | PN2270 |
| Apr. 21, 1995 | (AU) | ............................................... | PN2499 |
| Sep. 14, 1995 | (AU) | ............................................... | PN5424 |
| Oct. 25, 1995 | (AU) | ............................................... | PN6145 |

(51) Int. Cl.[7] .......................... H04N 5/913; H04N 9/80
(52) U.S. Cl. ......................................... 386/10; 386/94
(58) Field of Search ................................ 386/10, 9, 94, 386/95, 46, 1, 12, 21, 61, 84, 93, 113; 360/15; H04N 5/913, 9/80

(56) References Cited

U.S. PATENT DOCUMENTS 4,163,253 A * 7/1979 Morio et al.

5,748,733 A * 5/1998 Quan ........................... 380/15

FOREIGN PATENT DOCUMENTS

| FR | 2 549 322 A | 1/1985 |
| WO | WO 1 16791 A | 10/1991 |

* cited by examiner

*Primary Examiner*—Robert Chevalier
(74) *Attorney, Agent, or Firm*—Wolf, Greenfield & Sacks, P.C.

(57) ABSTRACT

A method of treating a video signal to allow playing on a video cassette recorder (VCR) but not to allow copying using a VCR having an automatic gain control (AGC) when recording. The method involves inserting one or more pulses (22) into the back porch (36) during the horizontal blanking interval and attenuating the last lines (24) of the picture information portion (16) and horizontal synchronization information (18) at the end of each alternate frame. The pulses (22) comprise a pulse signal (44) inserted into the color burst information portion (34), an opposing pulse signal (45) having a magnitude sufficient to offset the change in the dc level of the color burst portion (34), caused by the pulse signal (44), and a further pulse (50) inserted somewhere from the last half of the remainder of the back porch (36) to the end of the start of the picture information portion (16). Consequently, the dc level of the color burst information portion (34) is always maintained at the same level it was prior to the insertion of the pulses (20). A particular encoder (52) is also disclosed together with a method and apparatus (10) decoding a video signal treated in the aforementioned manner so as to recover the original video signal.

59 Claims, 5 Drawing Sheets

METHOD AND APPARATUS FOR TREATING A VIDEO SIGNAL

TECHNICAL FIELD

This invention relates to a method and apparatus for treating a video signal and decoding the same. The invention has particular utility in the treatment of video signals and the provision of video tapes for normal consumption by way of sale or hire having a treated video signal thereon which limits the possibility of making an acceptable copy of the treated video signal on to another video tape using a standard video signal recording system (VCR), having an automatic gain control (AGC) for adjusting the video signal level during recording thereof, whilst allowing for normal playing and viewing of the videotape having the original treated signal thereon. The invention also has utility with respect to the decoding of such treated video signals to allow reconstitution of the original video signal in certain situations where this may be necessary.

In a standard phase alternating line (PAL) video signal, there are 312 and one half lines per field, where by two fields are displayed in succession in an interfaced manner to generate one complete picture. Consequently, there are 625 separate raster lines on a screen making up one complete picture. For the purposes of the present invention, a frame is defined to constitute a single field, two frames being required to be displayed one after the other in an interlaced manner to make up a complete picture.

BACKGROUND ART

Methods and apparatuses for treating a video signal to prevent unauthorised recordings thereof have been described in the past. For example, U.S. Pat. No. 4,163,253 by Sony describes a method and an apparatus for treating a video signal to prevent satisfactory video picture reproduction as a result of further recording the treated video signal using a VCR having an AGC used in the recording process. The method employed by the Sony patent relies upon inserting a pulse signal into the back porch of the horizontal synchronisation pulse having an amplitude that is much greater than the peak white level of a VCR on which it may be recorded, and which pulse signal is used to upset the normal operation of the AGC of the VCR recording the treated signal. The specification provides a good overview of the conceptual operation of AGCs used during the recording operation of normal VCRs, which is relevant to the present invention.

Notwithstanding the method and apparatus described in the Sony U.S. Pat. No. 4,163,253, the described arrangement did not work for reasons outlined in U.S. Pat. No. 4,819,098 by Macrovision. Moreover, as described in the latter patent specification, many television monitors and receivers use the back portion region of the back porch, prior to the picture information portion of the video signal, for black-level clamping. Thus, although the basic principle may have worked in preventing copying of the treated signal by VCRs with AGCs, the treated signal also could not be properly played and viewed on a VCR when the AGC was not being used at all, since the inserted pulse signal interfered with the black-level clamping function of monitors and receivers making the picture black.

Macrovision in their U.S. Pat. No. 4,819,098 looked at using the same principle of upsetting the operation of the AGC during unauthorised recordings, but instead of placing the pulse signal within the back porch during the horizontal synchronisation intervals between picture information within a field, which would conflict with the black-level clamping operation of the television monitor or receiver immediately prior to displaying the picture information portion of a line, pulse signals were inserted into only those back porch intervals of the synchronisation pulses, in clusters thereof, during the vertical blanking interval.

A limitation of this technique is that the signals can not be inserted into the horizontal blanking intervals occurring during the scanning of lines of picture information within a field or frame, or any significant number of these. Thus the pulse signal could only be inserted during the vertical blanking interval at the end of a frame and at the start of the next frame, so as not to unduly deplete the picture image during normal playing of the treated signal.

In the Macrovision technique, however, the reason for the depletion of the picture image during normal playing of the treated signal, was not due to the black-level clamping problem experienced in the Sony technique. Rather, in the Macrovision technique, the pulse signals are specifically inserted into the colour burst portion of the horizontal blanking interval which affects the brightness of the displayed picture. Thus, the resultant technique if used in too many lines of the video signal during a frame, would cause a continuous variation in the brightness of the viewed picture which would upset normal viewing, as opposed to only introducing this effect on copied versions of the treated signal.

One of the reasons for inserting the pulse signal in the colour burst portion was to avoid interfering with the remainder of the back porch as this part of the signal during the vertical blanking interval is used by teletext and data casting systems as well.

Other methods which have similarly tried to prevent the acceptable copying of video tapes produce a phenomenon known as black-level depression. In these methods, the treated video signal's colours which are meant to be grey are represented as black. The treatment of the video signal using this technique is relatively expensive and video tapes employing the same are expensive to purchase and typically require studio quality video recorders to make the original recording. Studio quality video recorders are considerably more expensive than home video recorders or modified home recorders and hence the use of this system is unattractive to video shop outlets who may be permitted to make original recordings in most instances.

SUMMARY OF INVENTION

It is an object of the present invention to provide a method and apparatus for treating a video signal for reproduction on a main or master video cassette tape using a modified standard VCR or professional VCR with AGC switched off, whereby the treated video signal substantially prevents or at least mitigates the ability to acceptably copy a video signal therefrom for displaying using a standard VCR having an AGC for adjusting the video signal level during recording but not during play.

It is a further object of the present invention to provide a method and apparatus for treating a video system and decoding the same which overcomes some of the deficiencies or limitations associated with the techniques described in the aforementioned prior art.

In accordance with one aspect of the present invention, there is provided a method for treating a video signal to mitigate the ability of a video signal recording system having an automatic gain control for adjusting the video signal level, copying an acceptable video signal for displaying therefrom, including:

inserting a pulse signal into the video signal during a horizontal blanking interval of a line of the video signal, said pulse signal having a magnitude sufficient to cause the treated video signal to overcompensate the automatic gain control of the video signal recording system; and biasing a portion of the video signal during said horizontal blanking interval to offset the direct current (dc) voltage shift caused in the video signal by said inserting;

wherein said pulse signal is inserted into a sufficient number of lines of the video signal to cause visual impairment of the reproduced picture information contained in a copy made of the treated video signal by said video signal recording system.

In accordance with another aspect of the present invention, there is provided a method for decoding a treated video signal as defined in the preceding aspect of the present invention, including:

clamping or switching out the dc voltages of the inserted pulse signals and opposing pulse signals in the treated video signal to the video blanking level; and stabilising the amplitude of the synchronisation pulses.

In accordance with a further aspect of the present invention, there is provided an apparatus for treating a video signal to mitigate the ability of a video signal recording system, having an automatic gain control for adjusting the video signal level, copying an acceptable video signal for displaying therefrom, including:

receiving means to receive the video signal;

pulse generating means to generate a pulse signal of a prescribed magnitude sufficient to cause the treated video signal to overcompensate the automatic gain control of the video signal recording system when inserted into the video signal;

inserting means to insert said pulse signal into the video signal during a horizontal blanking interval of a line of the video signal; and biasing means to bias a portion of the video signal during said horizontal blanking interval to offset the dc voltage shift caused in the video signal by said pulse signal;

wherein said inserting means is controlled to insert said pulse signal into a sufficient number of lines of the video signal to cause visual impairment of the reproduced picture information contained in a copy made of the treated video signal by said video recording system.

In accordance with another aspect of the present invention, there is provided an apparatus for decoding a video signal treated in accordance with a method as defined in the first aspect of the present invention or an apparatus as defined in the preceding aspect of the present invention, including:

decoder receiving means to receive the treated video signal;

decoder clamping means to clamp or switch out the dc voltages of the inserted pulse signals and opposing pulse signals in the treated video signal to the video blanking level; and stabilising means to stabilise the amplitude of the synchronisation pulses.

BRIEF DESCRIPTION OF DRAWINGS

The invention will be better understood in light of the following description of two specific embodiments thereof. The description is made with reference to the accompany drawings, wherein.

DETAILED DESCRIPTION

The first embodiment is directed towards a method of treating a video signal and an encoder apparatus therefor, the video signal being a standard video signal of the type currently being used for recording onto standard video cassette tapes for normal consumption.

Figure 1:
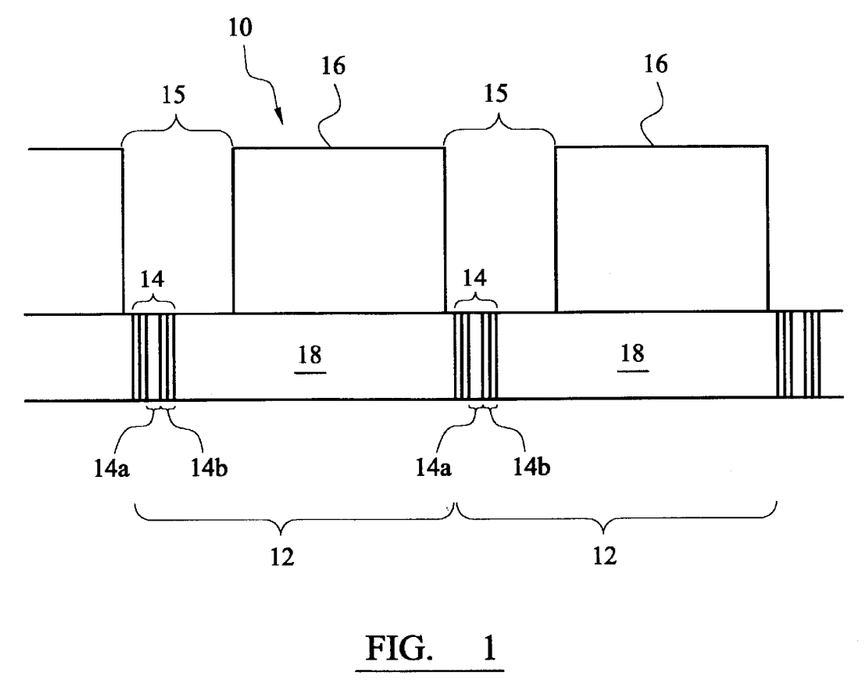
FIG. 1 is a diagrammatic representation of a plot of voltage against time of an original untreated video signal on a relatively large time scale showing successive frames of the original untreated video signal separated by vertical blanking intervals.

As shown in FIG. 1 of the drawings, a standard video signal 10 is made up of a continuous stream of fields or frames 12. Each frame 12 has vertical synchronisation information 14 provided during a vertical blanking interval 15, picture information 16 provided between the vertical blanking intervals 15, and horizontal synchronisation information 18 which is provided continuously throughout the vertical blanking intervals 15 and the picture information intervals 16.

As is well known in the art, each frame 12 begins with vertical synchronisation information 14 which denotes the beginning of a frame. The vertical synchronisation information essentially comprises a sequence of pre-equalisation pulses, a sequence of vertical synchronisation pulses and a sequence of post equalisation pulses, followed by an interval in which to set the black-level of the television monitor or receiver. There then follows a plurality of lines of picture information corresponding to horizontal lines on a television screen. Each line of the video signal 10 comprises horizontal synchronisation information 18, contained within a horizontal blanking interval 30, and picture information 16. The horizontal synchronisation information 18 is used to denote the beginning of a line of picture information 16 and is shown in more detail in FIG. 2 of the drawings.

Figure 2:
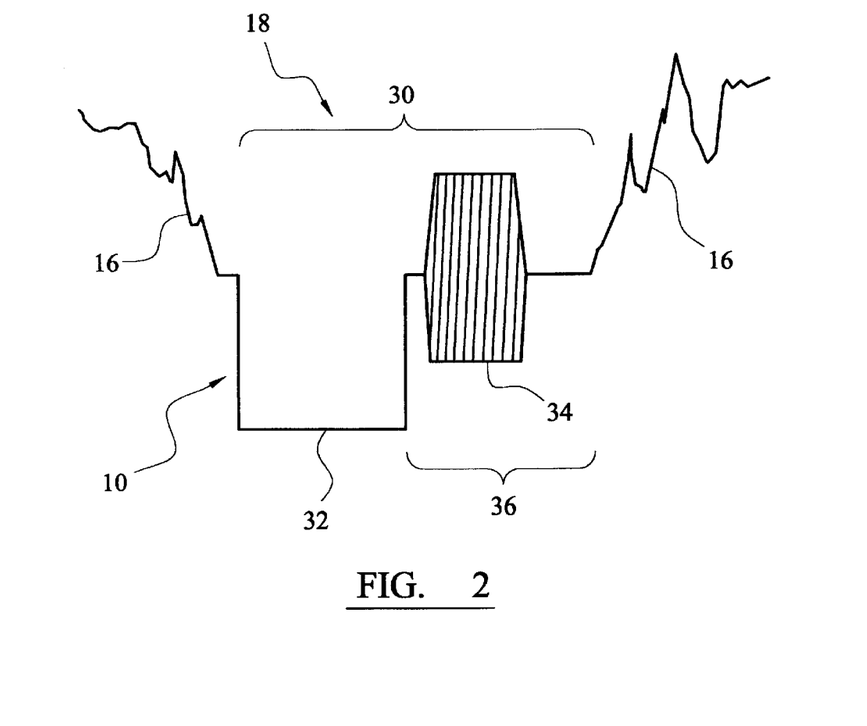
FIG. 2 is a plot of voltage against time of the original untreated video signal on a relatively small time scale showing a horizontal synchronisation pulse and a colour burst signal during the horizontal blanking interval between successive scan lines of the original untreated video signal.
Figure 3:
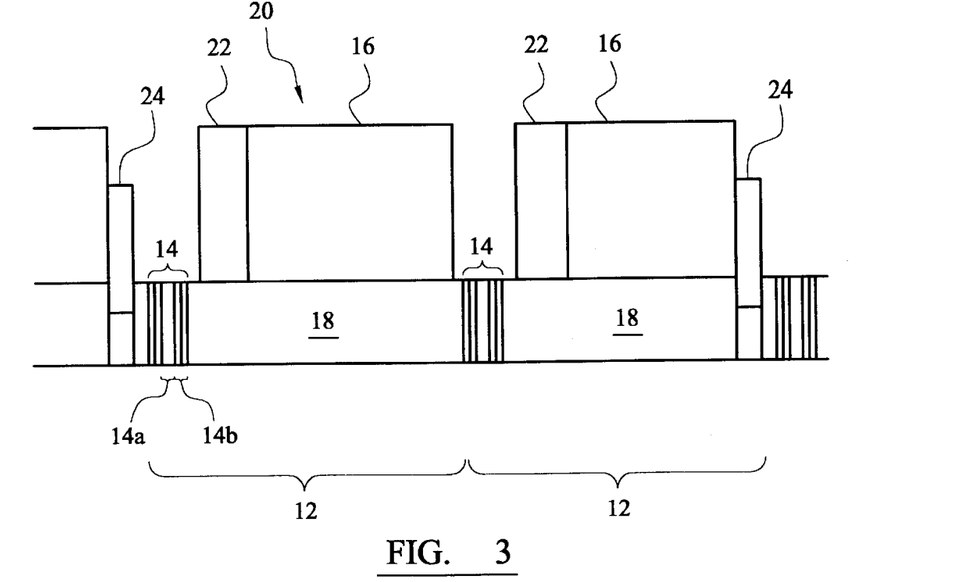
FIG. 3 is a diagrammatic representation of a plot of voltage against time of a treated video signal on a relatively large time scale similar to FIG. 1, but with the addition of pulse signals into the horizontal blanking intervals and the start of the picture information portions of the video signal, and also the attenuation of the last lines of each alternate frame.

The effect of the present embodiment is to produce a video signal 20 as shown in FIG. 3 of the drawings which has been treated in order to prevent acceptable copies being made thereof. Like reference numerals denote like parts of the video signal as shown in FIGS. 1 and 2 of the drawings.

As can be seen from the drawings, the video signal 20 further comprises the addition of various signal pulses 22 in the back porch 36 of the horizontal blanking interval 30 and the start of the picture information 16. These pulses 22 are shown more particularly in FIG. 4 of the drawings.

Each horizontal blanking interval 30 in the frame 12 is modified by the inclusion of the pulses 22, except in that portion of the vertical blanking interval 15 which comprises the vertical synchronisation pulses 14*a* and the post equalisation pulses 14*b*.

The video signal 20 is also treated in a manner so that the picture information 16 and the horizontal synchronisation information 18 are reduced in amplitude in the region 24 at the end of each alternate frame 12, as shown in FIG. 3. This attenuation of the video signal will be described in more detail later.

Figure 4:
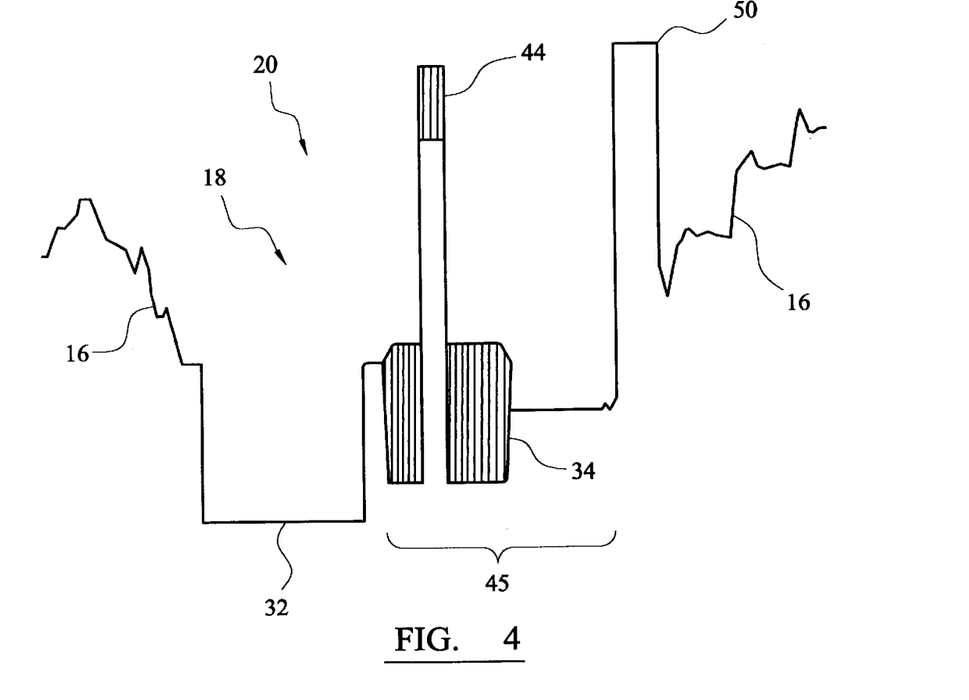
FIG. 4 is a similar plot to FIG. 2 but of the treated video signal showing the pulse signal, opposing pulse signal and further pulse signal inserted therein in accordance with the first embodiment.

As shown in FIGS. 2 and 4 of the drawings, the standard video signal 10 includes a horizontal synchronisation pulse 32 and a colour burst information portion 34, the latter being included on the back porch 36 of the horizontal blanking interval. As is known in the art, the synchronisation pulse 32 is used to synchronise each horizontal line of a frame 12 and the dc level of the colour burst information portion 34 is used by the automatic gain control (AGC) of a standard video cassette recorder (VCR) to scale the signal level of the picture information 36 when recording.

As shown in FIG. 4 of the drawings, the treated video signal 20 has a pulse signal 44 inserted into the colour burst information portion 34, an opposing pulse signal 45 which is negative relative to the pulse 44 inserted into the back porch 36 and has a pulse width extending from the commencement of the colour burst information portion 34 to the commencement of the picture information signal 16, and a further pulse signal 50 inserted into the start of the picture information portion 16. These pulses 44, 45 and 50 represent pulses 22 shown in FIG. 3 of the drawings.

The magnitude of pulses 44 and 50 is sufficient to drive the video signal at the portions that they are applied into the peak white level which is clipped by the white clipper circuit of the VCR.

The pulse 44 effectively prohibits acceptable recordings of the treated video signal being made by virtue of its large amplitude in the colour burst information portion 34 by causing the AGC in a VCR which is recording the treated video signal, to overcompensate for the actual amplitude of the picture information 16, believing that it is of considerably larger magnitude as represented by the pulse 44, than it actually is. Consequently, the AGC operates to reduce the amplitude of the picture information 16 in the recorded version of the treated video signal. The further pulse 50 exacerbates the effect on the AGC so that on the recorded copy of the treated video signal 20, the picture information 16 and the synchronisation pulses 32 are of substantially reduced amplitude making the picture displayed during playback of this recorded copy extremely dark and difficult to view. In addition, the attenuated section 24 can cause vertical jitter and horizontal disturbances.

It needs to be appreciated that in order to overcome the problems previously described with respect to the Sony and Macrovision patents, the provision of the opposing pulse signal 45 and the precise positioning of the pulse 50 is important. Moreover, the pulse 45 is inserted to offset the dc shift caused by insertion of the pulse 44 into the colour burst portion of the signal. In this respect, insertion of the pulse 44 into the colour burst information portion 44 changes the average dc level thereof and so if not offset, causes black-level depression or black-level crushing problems on the original recording, as experienced in the Macrovision technique.

The pulse width of the pulse signal 44 is relatively small, being in the order of 0.4 microseconds compared to the width of the colour burst information portion 34, being in the order of 2.5 microseconds. Consequently, the pulse 45 by extending over the remainder of the back porch 36 from the start of the colour burst information portion need only be of a comparatively small amplitude to negative dc bias the colour burst portion 34. Typically, where the peak to peak level of the video information signal is approximately 1 volt the negative amplitude of the opposing pulse 45 may vary from blanking level down to 0.15 volts.

In the present embodiment, the pulse 45 is approximately of 7 microseconds duration and causes a slight negative shift in the entire remainder of the back porch 36 after the colour burst portion 34 as well as in the colour burst portion 34. This is necessary for certain makes of VCR which require dc shifting of the back porch for a period slightly after the end of the colour burst portion.

With respect to the further pulse signal 50, this cannot be situated in the first half of the remainder of the back porch 36 immediately following the colour burst information portion 34 due to the fact that this part of the back porch is used for black-level clamping as well as part of the colour burst detection on certain VCR's as previously described. Accordingly, if the further pulse 50 appeared in this region, it would suffer the same problems as experienced by the Sony technique. Accordingly, locating the pulse 50 at the start of the picture information portion 16 of the signal avoids any possibility of affecting the black-level clamping, and further, as the first lines of the picture information are not displayed on the television monitor or receiver, the further pulse 50 does not affect the picture image in any way.

Consequently, the pulses 44, 45 and 50 all function to prohibit effective duplication of the treated video signal 20 on a normal VCR having an AGC, but have no material effect on the straight playing of the treated video signal which is undertaken without the AGC.

With respect to the region of attenuated synchronisation information 18 and picture information 16, typically this region is in the last five to fifteen lines of every second frame 12. These lines similarly are not usually displayed on the television screen and so their attenuation similarly would have no effect on the picture image seen by the viewer. However, when an attempt is made to duplicate the recorded treated video signal 20, the initial effect of the pulses 22 on the AGC in recording the treated signal cause the amplitude of the picture information 16 and the horizontal synchronisation information 18 to be reduced in amplitude still further in the region 24. This further reduction in amplitude causes the television monitor or receiver to sometimes misinterpret the reduced amplitude of the horizontal synchronisation information 18 in the region 24 as being the commencement of the vertical synchronisation information 14 for the next frame. Consequently, the effect is to produce a random vertical jittering or jumping of the duplicated signal, further reducing the quality of the recorded copy of the treated video signal 20.

In the present embodiment, as the AGC of different VCRs look at different portions of the colour burst information portion 34 in order to determine the relevant gain, it is necessary for the position of the pulse signal 44 to be varied within the colour burst information portion 44, so as to have an effect at least some of the time on the scanned lines of picture information on the operation of the AGC. Consequently, the method of the present embodiment also envisages varying the position of the pulse signal 44 continuously throughout the colour burst information portion 34 during successive horizontal blanking intervals of the video signal. In addition, the present embodiment involves the pulse signal 44 varying in amplitude from line to line or frame to frame with corresponding adjustments being made to the amplitude of the opposing pulse signal 45 to offset the pulse signal 44 so that the effective dc level of the colour burst information portion remains unaffected. This modulation of the position and amplitude of the pulse 44 produces a flashing effect on a resultant picture produced by playing a copy of the treated video signal made on a standard VCR, further reducing the viewability of the picture information.

Figure 5:
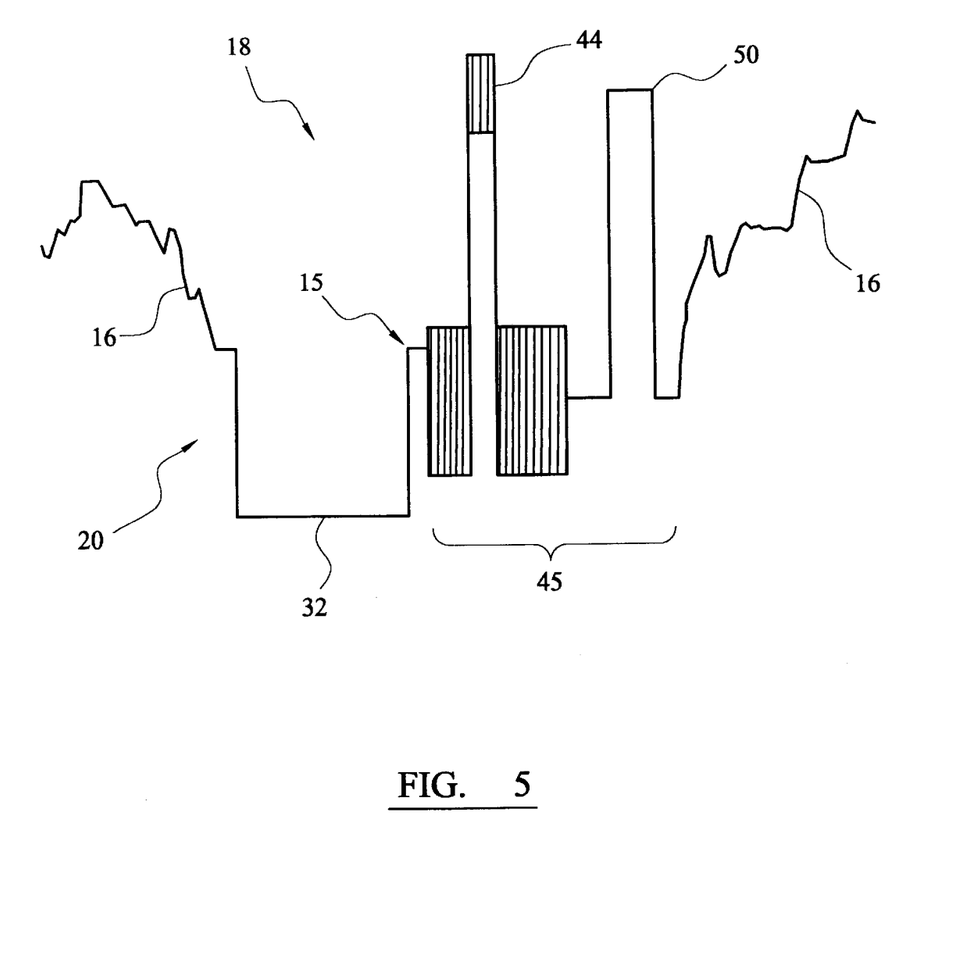
FIG. 5 is a similar drawing to FIG. 4, but showing the further pulse signal inserted in the back porch of the horizontal blanking interval in an alternative embodiment to the first embodiment of the description.

As with the pulse signals 44 and 45, the further pulse 50 at the start of the picture information can also vary in amplitude and width from line to line or frame to frame, from peak white level down to video blanking level. The width of the further pulse 50 can also vary from its normal width of approximately 2 microseconds narrower or wider. Ideally, the pulse width of the further pulse 50 would be at least 3 microseconds and extend into the second half of the remainder of the back porch 36 following the colour burst information portion 34. By remaining in the second half of this remainder of the back porch, the black-level clamping performed by the television monitor or receiver remains unaffected and so the problems associated with the Sony technique, are still avoided, whilst maintaining a wider pulse which has a more pronounced supplementary effect upon the AGC, than would a narrower pulse. In addition, in alternative embodiments of the present invention, the further pulse 50 may reside wholly in the second half of this remainder of the back porch as shown in FIG. 5 of the drawings, where the same reference numerals have been used to denote like parts of the treated video signal as shown in FIG. 4 of the drawings.

Figure 6:
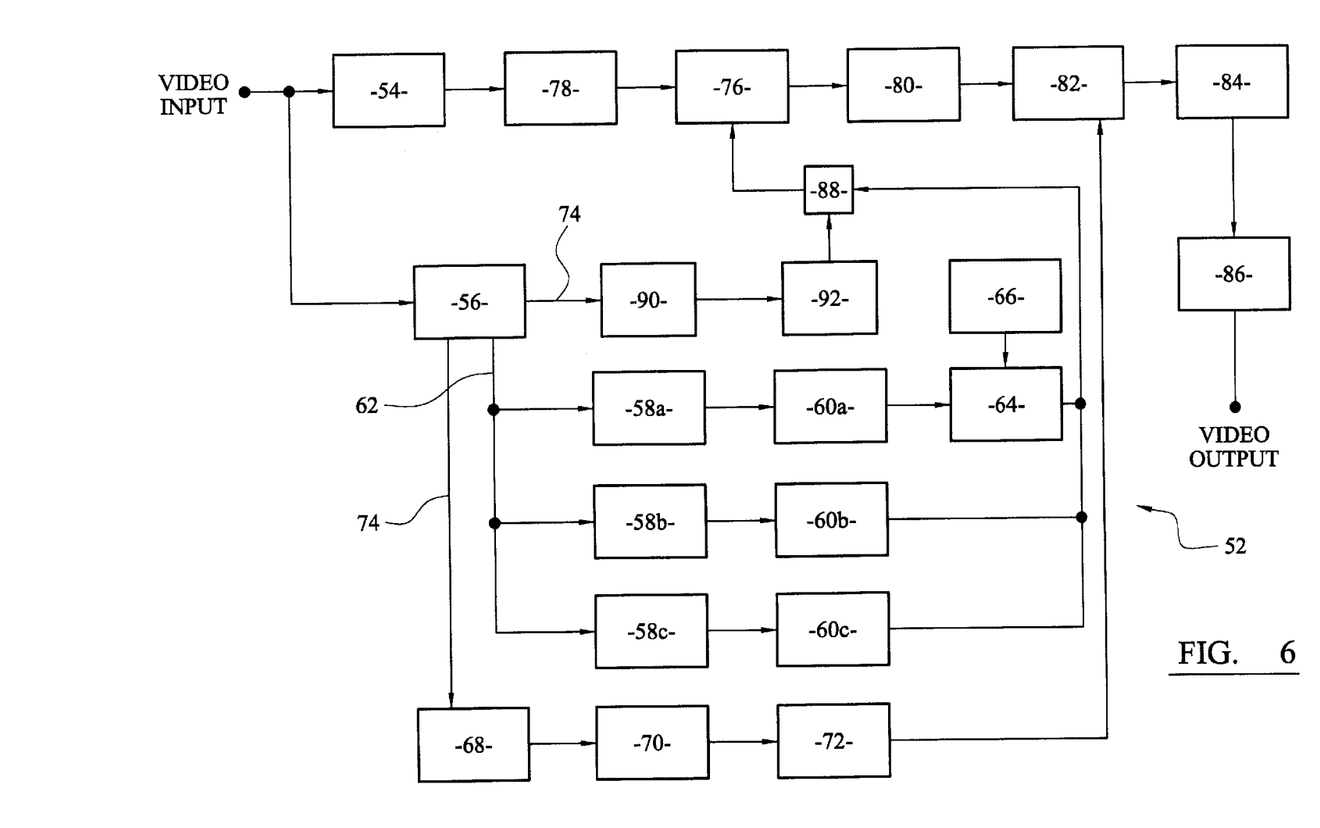
FIG. 6 is a block diagram showing the encoder apparatus for treating the video signal in accordance with the first embodiment.

Now describing the apparatus 52 for producing the treated video signal, there is essentially provided a receiving means, various pulse generating means and biasing means, video signal attenuating means and stabilising means prior to outputting the treated video signal.

As shown in FIG. 6 of the drawings, the receiving means comprises a back porch clamping circuit 54 and a synchronisation pulse separator 56. The back porch clamping circuit 54 clamps the back porch of the horizontal synchronisation pulses of the incoming video signal to help cancel any ac alternating current (ac) voltage component from the horizontal synchronisation pulses which could cause incorrect synchronisation pulse separation.

The synchronisation pulse separator 56 operates to separate the vertical and horizontal synchronisation pulses from the video signal to use them as a reference point for subsequent operation of the various pulse generating means and biasing means.

The various pulse generating means and biasing means in the present embodiment are divided into independent timing means in the form of monostable multivibrators 58 and pulse generators 60, one of each being provided for the generation of each pulse 22. Thus, a timing circuit 58a and a pulse generator 60a is provided for generating the pulse signal 44, a timing circuit 58b and a pulse generator 60b forming the biasing means to generate the opposing pulse signal 45, and a timing circuit 58c and a pulse generator 60c being provided for generating the further pulse 50.

Accordingly, the synchronisation pulse separator 56 provides a reference signal at its output line 62 triggered on the trailing edge of each horizontal synchronisation pulse received. The reference signal triggers the timing circuit 58a to produce a 1 microsecond delay before it triggers the pulse generator 60a to produce an outward pulse of a width of approximately 0.4 microseconds. The reference signal further triggers the timing circuit 58b to produce a delay of 0.5 microseconds before it triggers the pulse generator 60b to provide an output pulse of a duration of approximately 7 microseconds. Finally, the reference signal at the control line 62 triggers the timing circuit 58c to produce a delay of approximately 5 to 7 microseconds before it triggers the pulse generator 60c to produce the source of the further pulse 50 with a delay of anything from 1.5 microseconds to 4 microseconds as required.

The output of the pulse generator 60a is input to a modulation circuit 64 which operates to modulate the output pulse signal in time with approximately a 1 microsecond shift, so as to move the pulse back and forth in the colour burst information portion 34, and in amplitude between the maximum peak value of 1.2 to 1.4 volts and the blanking level. This modulation is achieved with a 0.5 to 2 hertz oscillator 66 which feeds the modulation circuit 64 to shift the pulse in time and amplitude. This shift in the position of the pulse 44 in the colour burst area, as previously described, causes the AGC and the recording VCR to continually change its gain, resulting in any copy of the treated video signal being displayed having the picture image go bright then dark at an annoying rate to watch by the viewer.

The pulse generator 60b is designed to produce a negative pulse to constitute the source of the opposing pulse signal 45, relative to the pulse signal 44. This negatively biases the remaining back porch region of the video signal from 0 down to approximately 0.08 of a volt, relative to the blanking level. If necessary, the resultant opposing pulse signal could go down as far as 0.15 volts to reduce any black-level crushing which may occur.

As previously described, the resultant pulse output by the pulse generator 60c is a positive pulse and is used as a peak level white signal which is placed at the start of the picture information. As with the preceding pulses, this pulse can also vary in amplitude from blanking up to the peak white clip level or even a higher level. Accordingly, the pulse is used to also act against the recording VCR's AGC system to further reduce the amplitude of a copy of the original recording so as to degrade the resultant picture further.

The video signal attenuating means comprises a vertical synchronisation pulse divider 68, an attenuating timing circuit 70 and a pulse generator 72. The vertical synchronisation pulse divider 68 receives a second output signal from the synchronisation pulse separator 56 which issues a reference signal in respect of each occurrence of the vertical synchronisation pulse sequence. Thus, the reference signal provided on the output line 74 is provided at the frame rate, typically 50 hertz. This reference signal is further divided by two to produce a pulse at half frame rate (that is 25 hertz) by the vertical synchronisation pulse divider 68. The output signal from the vertical synchronisation pulse divider is therefore produced at the start of each vertical synchronisation pulse sequence of each alternate frame and is input to the attenuating timing means to cause a delay of one frame period less five to fifteen lines, before triggering the pulse generator 72. Once triggered, the pulse generator 72 generates a pulse at the commencement of the last set of lines and having a pulse width corresponding to the remainder of the scanned picture information lines until the commencement of the next vertical blanking interval. Thus pulses generated by the pulse generator 72 last five to fifteen lines and are used to attenuate the overall video level of these last five to fifteen lines of each alternate frame.

The inserting means comprises a pulse mixer 76 which receives the original video signal after it has been passed through the back porch clamping circuit 54 and an initial video amplifier 78. The pulse mixer 76 inserts the various pulse signals 44, opposing pulse signals 45 and further pulse signals 50 generated by the respective pulse generators 60 and modulation circuit 64. The pulse mixer 76 effectively adds these pulses into the original video signal to produce the treated video signal as shown in FIG. 4. In order to prevent the pulses 22 being inserted during part of the vertical blanking interval, the apparatus 53 includes a vertical blanking interval suppressing means. The video blanking interval suppressing means essentially comprises an electronic switching means 88 controlled by a pulse generating means comprising a timing circuit 90 and a pulse generator 92 similar to the timing circuits 58 and pulse generator 60. The timing circuit 90, however, is connected to the output control line 74 providing the vertical synchronisation pulse sequence for each frame and provides a delay commensurate to the duration of the pre-equalisation pulses of the vertical blanking interval for triggering the pulse generator 92 to produce an output control pulse which controls the operation of the switching means 88 to stop the input of the generated pulse signal 44, opposing pulse signal 45 and further pulse signal 50 to pulse mixer 76. The duration of the control pulse generated by the pulse generator 92 is commensurate to the duration of the sequence of vertical synchronisation pulses and post equalisation pulses so that at the end of this period, the switching means 88 is closed once more to allow the pulse generator 60 to apply their respective pulses to the pulse mixer 76 for insertion into the video signal.

The resultant video signal from the pulse mixer 76 is buffered by a further video amplifier 80 and is fed through a field attenuating circuit 82 which constitutes the video signal attenuating means for attenuating the last five to fifteen lines of each alternate frame of the video signal as shown at 24 in FIG. 3. Accordingly, the output pulse of the pulse generator 72 is connected to the field attenuating circuit 82 to effect this attenuation. In the present embodiment, the attenuated section at 24 is adjusted by the field attenuating circuit 82 so that the dc level of a normal blanking level is reduced by 0.5 to 0.1 volts towards the synchronisation pulse tip level.

The output of the field attenuating circuit 82 is passed through a stabilising means in the form of a synchronising pulse tip clamping circuit 84. This circuit clamps all of the synchronisation pulse tips to the same level to ensure that there are no horizontal synchronisation problems created as a result of the pulse mixing and video signal attenuating performed by the respective circuits 76 and 82.

After passing the treated video signal through the synchronisation tip clamping circuit 84, the treated video signal is amplified by an output video amplifier 86 to provide the treated video signal at the correct voltage levels.

It should be noted that the original recording encoded with the encoder apparatus of the present embodiment would have acceptable picture quality since the average dc level of the colour burst information 34 is unaffected by the treatment of the video signal. Furthermore, it should be noted that no black-level depression or black-level crush would be apparent on a normal television receiver.

Although the above encoder apparatus would perform quite satisfactorily, it should be appreciated that there would be many other circuits which are capable of performing the encoder function of the described apparatus and method, and that such other circuits or apparatus are considered to merely alternative embodiments of the present invention and hence fall well within its scope.

Thus the treated video signal can be satisfactorily reproduced on a master VCR by using a professional VCR with the AGC switched off or a modified VCR having the same effect. Accordingly, with the AGC switched off, it is imperative to ensure that the treated video signal being recorded is presented at the correct voltage levels which-would otherwise be controlled by the AGC. Nonetheless, in applications where it is desirable to allow the treated video signal 20 to be recorded once, but that further recordings from this main recorded copy be prohibited, the present embodiment has great utility. Such applications would include video stores which are allowed under license to duplicate video cassettes. In this situation it would be desirable to physically prevent persons renting video cassettes to be able to duplicate the recording using standard VCRs, and at the same time be further desirable for the treated video signal 20 to be recorded by the video store proprietor without using a studio quality VCR.

Whilst the aforementioned method and apparatus of the first embodiment can effectively be used to reduce video piracy, in some instances it will be necessary for people who are licensed to encode such tapes to produce treated video signals therefor, to also be able to decode these encoded tapes. Video libraries with damaged encoded video tapes that are used for hire may need repair and the proprietors thereof may be licensed to decode and re-encode these tapes under such license.

Other areas such as satellite television, may require encoding of this signal, but also require a remote decoder so that the received signal can be recorded at a specified station but prevent other viewers recording the program illegally. Accordingly, the second embodiment is directed towards a method for decoding the treated video signal as described in the preceding embodiment and a decoder apparatus for performing such method.

Figure 7:
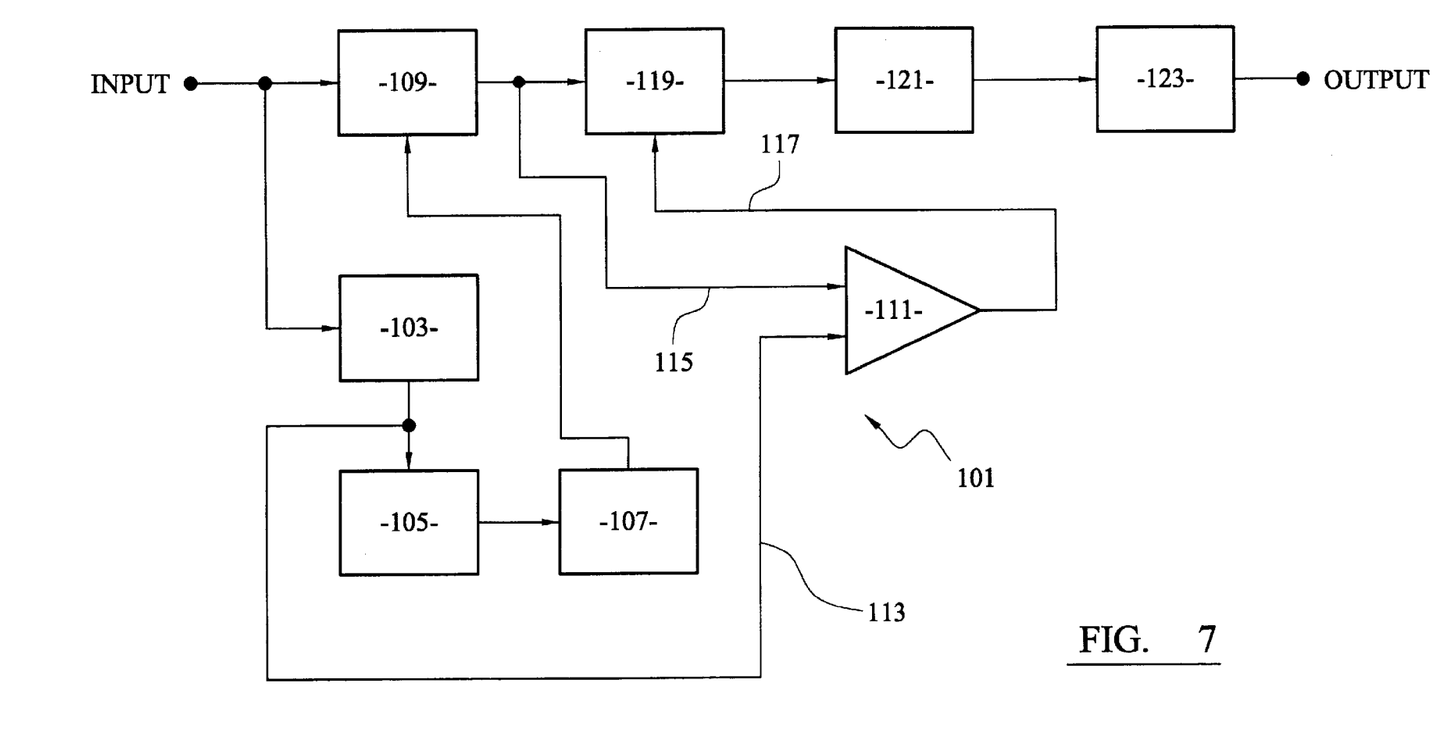
FIG. 7 is a block diagram of the decoder apparatus in accordance with the second embodiment.

In the present embodiment, the method of decoding the treated video signal involves regenerating the original amplitudes for the synchronisation pulses, generating a wide clamping pulse and clamping incoming video signals to a reference level during the application of such a pulse, automatically controlling video output levels and stabilising the reconstituted video signal by clamping the output synchronizing levels to a reference level.

As shown in FIG. 7 of the drawings a decoder apparatus 101 essentially comprises decoder receiving means to receive the treated video signal, decoder clamping means to clamp out the dc voltages of the inserted pulse signals, detecting means to detect the attenuated amplitude of the video signal, amplifying means to restore the relevant amplitude levels to their correct video levels and stabilising means to stabilise the resultant amplitude of the synchronisation pulses.

The decoder receiving means comprises a synchronisation pulse separator 103, substantially identical to the synchronisation pulse separator 56 of the preceding embodiment, with the exception that only the horizontal synchronisation pulses are of concern.

The decoder clamping means includes a decoder timing circuit comprising a first monostable multivibrator 105, a second monostable multivibrator 107 and a clamping amplifier 109. The first monostable 105 is triggered by the trailing edge of the horizontal synchronisation pulse signal output by the synchronisation pulse separator 103. The monostable 105 produces a pulse with a width of approximately 0.5 microseconds to create a delay commensurate to the time it takes for the colour burst information portion 34 to be propagated on the treated video signal. This output signal triggers the second monostable multivibrator 107 with its trailing edge, to produce a wide clamping pulse. This pulse is used to clamp the dc voltages of the encoded pulses down to the video blanking level by being connected to the clamping amplifier 109. Accordingly, the pulse generated by the monostable 107 is approximately 9 microseconds wide, covering the period of propagation of the opposing pulse signal 45 at the commencement of the colour burst information portion 34, the pulse signal 44 occurring anywhere within the colour burst information portion, and the further pulse signal 50 occurring either in the start of the picture information portion of the treated video signal or in the last half of the remainder of the back porch between the end of the colour burst information portion 34 and the start of the picture information portion 16.

It should be noted that the clamping amplifier 109 may in some cases need to be followed by another clamping amplifier in order to bring the amplitude of the pulse signals 44 and 50 back down to the video blanking level due to the fact that these pulses are of very high amplitude and can require a large amount of suppression to cancel their effect on the AGC system of a video recorder.

The detecting means comprises a comparator circuit 111 which receives one input via the input line 113 from the output of the synchronisation pulse separator 103 to detect the amplitude of the separated horizontal synchronisation pulse, and a second input derived from the output of the clamping amplifier circuit 109 which is input via the input line 115. Thus, the comparator compares the difference between the blanking level provided at input line 115 with the horizontal synchronisation pulse level provided on input line 113 and uses this voltage differential as a reference to maintain the amplitude of the outgoing horizontal synchronisation pulses to an exact level, which in the present embodiment is 0.3 volts.

The amplifying means comprises an automatic gain control amplifier 119. Accordingly, the output of 117 of the comparator 111 drives the automatic gain control amplifier 119 to amplify the amplitude of the horizontal synchronisation pulses and corresponding picture information portions of the treated video signal to restore the same to the correct video levels as were provided in the original video signal. Thus, the automatic gain control amplifier 119 together with the comparator circuit 111 constitutes amplitude adjusting means which correct the attenuated signal levels of the last five to fifteen lines of each alternate frame to their original levels and adjusts the correct voltage levels of the horizontal synchronisation pulses and the picture information signal, simultaneously.

The stabilising means comprises a synchronisation pulse tip clamping amplifier 121 substantially identical to the amplifier 84 of the preceding embodiment, whereby this amplifier effectively clamps the synchronisation pulse amplitudes at the same level. The restored video signal is then fed to an output amplifier 123 to drive the video output at correct levels into a 75 ohm load as the output from the decoder.

It should be appreciated that there are many other methods available to remove the encoded signals of the treated video signal produced in accordance with the first embodiment. For example, an electronic switch to switch out the further pulse 50 may be used and clamping circuits used only to clamp out the pulse signals 40 and 45. Other methods may not use monostable multivibrators for timing means and instead may use an EPROM integrated circuit to produce similar pulses.

It should be appreciated that the scope of the present invention is not limited to the specific embodiments herein described. Accordingly, modifications and variations of the various apparatus described and methods described which would be apparent to a skilled addressee in the field of the invention are deemed to fall within the scope of the present invention.

What is claimed is:

1. A method for treating a video signal to mitigate an ability of a video signal recording system having an automatic gain control for adjusting the video signal level, to copy an acceptable video signal for displaying therefrom, including:
   inserting a pulse signal into the video signal during a horizontal blanking interval of a line of video signal to provide a treated video signal, said pulse signal having a magnitude sufficient to cause the treated video signal to overcompensate the automatic gain control of the video signal recording system; and
   biasing a portion of the video signal during said horizontal blanking interval to offset a direct current (dc) voltage shift caused in the video signal by said inserting;
   wherein said pulse signal is inserted into a sufficient number of lines of the video signal to cause visual impairment of a reproduced picture information portion contained in a copy made of the treated video signal by said video signal recording system.

2. The method as claimed in claim 1, further comprising inserting said pulse signal into a color burst portion of the video signal during said horizontal blanking intervals, the pulse signal having a width sufficiently less than the color burst portion so as to not affect the function of said color burst portion during normal playing of the video signal.

3. The method as claimed in claim 1, wherein the biasing comprises inserting an opposing pulse signal into the horizontal blanking interval, the opposing pulse signal having a predetermined magnitude and width to offset the dc voltage shift caused by inserting the pulse signal.

4. A method as claimed in claim 1, including inserting a further pulse signal into lines of the video signal having said pulse signal sometime after a completion of a color burst portion of the video signal, the further pulse signal having a magnitude sufficient to cause at least one of the treated video signal to further overcompensate the automatic gain control of the video signal recording system and visual impairment of the reproduced picture information portion contained in a copy made of the treated video signal by said video signal recording system.

5. A method as claimed in claim 4, wherein said further pulse signal is from 1.5 to 4 microseconds in width.

6. A method as claimed in claim 4, including inserting said further pulse signal after at least half of a time period of a back porch of a horizontal synchronisation pulse from an end of said color burst portion to a start of said picture information portion, has elapsed.

7. A method as claimed in claim 4, including inserting said further pulse signal after at least a commencement of the picture information portion of the video signal within said lines.

8. A method as claimed in claim 1, including varying a point of insertion of said pulse signal within said horizontal blanking interval from at least one of line to line and frame to frame.

9. A method as claimed in claim 2, including varying a point of insertion of said pulse signal within said color burst portion from at least one of line to line and frame to frame.

10. A method as claimed in claim 1, including varying an amplitude of said pulse signal from at least one of line to line and frame to frame.

11. A method as claimed in claim 1, including attenuating an amplitude of a horizontal synchronisation pulse and corresponding picture information portion of the video signal during last lines of alternate frames sufficiently such that an overcompensation of the automatic gain control of the video recording system caused by inserting said pulse signal crushes attenuated horizontal synchronisation pulses providing a premature emulation of vertical synchronisation pulses.

12. A method as claimed in claim 1, wherein said pulse signal is not inserted into the video signal during horizontal blanking intervals occurring during at least a vertical synchronisation pulse and post equalisation pulse sequences of a vertical blanking interval of each frame.

13. A method for decoding a treated video signal, including:
receiving a treated video signal having a pulse signal and an opposing pulse signal inserted in a horizontal blanking interval thereof, and comprising a synchronisation pulse;
reducing dc voltages of the pulse signal and the opposing pulse signal inserted in the treated video signal to a video blanking level; and
stabilizing an amplitude of the synchronisation pulse.

14. A method as claimed in claim 13, including at least one of clamping and switching out a dc voltage of an inserted further pulse signal in the treated video signal to the video blanking level.

15. A method as claimed in claim 13, comprising:
attenuating an amplitude of a horizontal synchronization pulse and corresponding picture information portion of the video signal during last lines of alternate frames such that an overcompensation of the automatic gain control of the video recording system caused by inserting said pulse signal crushes the horizontal synchronization pulse so attenuated, providing a premature emulation of a vertical synchronization pulse;
detecting an attenuated amplitude of the horizontal synchronisation pulse and corresponding picture information portion of the last lines of the alternate frames of the treated video signal, and
amplifying the amplitude of said horizontal synchronisation pulse and corresponding picture information portion to restore same to correct video levels.

16. A method as claimed in claim 13, including:
determining an amplitude of a horizontal synchronisation pulse of the treated video signal;
comparing said amplitude of the horizontal synchronisation pulse with said video blanking level; and adjusting an amplitude of the treated video signal to maintain the amplitude of said horizontal synchronisation pulse at a correct level.

17. An apparatus for treating a video signal, to provide a treated video signal, which mitigates an ability of a video signal recording system, having an automatic gain control for adjusting the video signal level, to copy an acceptable video signal for displaying therefrom, including:
receiving means to receive the video signal;
pulse generating means to generate a pulse signal of a prescribed magnitude sufficient to cause the treated video signal to overcompensate the automatic gain control of the video signal recording system when inserted into the video signal;
inserting means to insert said pulse signal into the video signal during a horizontal blanking interval of a line of the video signal; and
biasing means to bias a portion of the video signal during said horizontal blanking interval to offset a dc voltage shift caused in the video signal by said pulse signal;
wherein said inserting means is controlled to insert said pulse signal into a sufficient number of lines of the video signal to cause visual impairment of reproduced picture information contained in a copy made of the treated video signal by said video recording system.

18. An apparatus as claimed in claim 17, wherein said inserting means is controlled to insert said pulse signal into a color burst portion of the video signal during said horizontal blanking interval, said pulse signal having a width sufficiently less than said color burst portion to not affect a function of said color burst portion during normal playing of the video signal.

19. An apparatus as claimed in claim 18, wherein said biasing means includes an opposing pulse generating means to generate an opposing pulse signal of a prescribed magnitude sufficient to achieve said offset, and said inserting means being controlled to insert said opposing pulse signal to said color burst portion such that a resultant dc voltage level of said color burst portion of the treated video signal is maintained at a same dc voltage level of said color burst portion in the video signal.

20. An apparatus as claimed in claim 19, wherein said opposing pulse signal is of a width commensurate to a remainder of a back porch of a horizontal synchronisation pulse from a commencement of said color burst portion to a commencement of a picture information portion of the video signal and said inserting means is controlled to insert said opposing pulse signal into said back porch at the commencement of said color burst portion.

21. An apparatus as claimed in claim 17, including a further pulse generating means to generate a further pulse signal of a prescribed magnitude sufficient to cause at least one of the treated video signal to further overcompensate the automatic gain control of the video signal recording system and visual impairment of the reproduced picture information contained in a copy made of the treated video signal by said video signal recording system when inserted into the video signal, and said inserting means being controlled to insert said further pulse signal into lines of the video signal having said pulse signal, sometime after a completion of a color burst portion of the video signal.

22. An apparatus as claimed in claim 21, wherein said further pulse signal is from 1.5 to 4 microseconds in width.

23. An apparatus as claimed in claim 21, wherein said inserting means is controlled to insert said further pulse into the video signal after at least half of a time period of a back porch of the horizontal synchronisation pulse from an end of said color burst portion to the start of a picture information portion, has elapsed.

24. An apparatus as claimed claims 21, wherein said inserting means is controlled to insert said further pulse signal after at least a commencement of a picture information portion of the video signal within said line.

25. An apparatus as claimed in claim 17, wherein said pulse generating means comprises a timing means to reference said pulse generating means and said inserting means with respect to a color burst portion.

26. An apparatus as claimed in claim 17, wherein said pulse generating means includes a time modulating means controlled to vary a point of insertion of said pulse signal by said inserting means within said horizontal blanking interval from at least one of line to line and frame to frame.

27. An apparatus as claimed in claim 18, wherein said pulse generating means includes a time modulating means controlled to vary a point of insertion of said pulse signal by said inserting means within said color burst portion from at least one of line to line and frame to frame.

28. An apparatus as claimed in claim 17, wherein said pulse generating means comprises an amplitude modulating means to vary an amplitude of said pulse signal, to anywhere between a blanking level and at least a peak white level from at least one of line to line and frame to frame.

29. An apparatus as claimed in claim 17, including an attenuating pulse generating means to generate an attenuating pulse signal and a video signal attenuating means to attenuate the video signal in response to said attenuating pulse signal, said attenuating pulse signal controlling said video signal attenuating means to sufficiently attenuate an amplitude of a horizontal synchronisation pulse and corresponding picture information portion of the video signal during last lines of alternate frames such that an overcompensation of the automatic gain control of the video recording system caused by insertion of said pulse signal, crushes attenuated horizontal synchronisation pulses, providing a premature emulation of vertical synchronisation pulses.

30. An apparatus as claimed in claim 29, wherein said attenuating pulse generating means includes an attentuating timing means to reference said attenuating pulse generating means and said signal attenuating means for attenuating the video signal with respect to said vertical synchronisation pulses each alternate frame.

31. An apparatus as claimed in claim 17, wherein said inserting means is controlled so as to not insert said pulse signal into the video signal during horizontal blanking intervals occurring during at least the vertical synchronisation pulse and post-equalisation pulse sequences of the vertical blanking interval of each frame.

32. An apparatus as claimed in claim 25, wherein said receiving means includes a synchronisation pulse separating means to separate horizontal synchronisation pulses and vertical synchronisation pulses out from the video signal to provide a reference for said timing means.

33. An apparatus as claimed in claim 32, wherein said receiving means further includes a back porch clamping means to cancel any alternating current (ac) voltage component from the horizontal synchronisation pulses to ensure correct operation of said synchronisation pulse separating means.

34. An apparatus as claimed in claim 30, wherein said attenuating timing means provides a delay of two frames less 5 to 15 lines of the picture information portion from the vertical synchronisation pulses of each alternate vertical blanking interval before said video signal attenuating means is triggered to attenuate the video signal.

35. An apparatus as claimed in claim 17, wherein said pulse generating means generates said pulse signal having a width of approximately 0.4 microseconds and a maximum amplitude sufficient to drive the video signal into or proximate to a maximum clipping voltage level of said video signal recording system during propagation of said pulse signal thereon.

36. An apparatus as claimed in claim 19, wherein said opposing pulse generating means generates said opposing pulse signal having a width of approximately 7 microseconds and an amplitude opposite to and dependent upon an amplitude of said pulse signal to provide for said offset during propagation of said opposing pulse signal on the video signal.

37. An apparatus as claimed in claim 21, wherein said further pulse generating means generates said further pulse signal having a width of approximately 1.5 to 4 microseconds and a maximum amplitude sufficient to drive the video signal to approximately a maximum clipping voltage level of said video signal recording system during propagation of said pulse signal thereon.

38. An apparatus as claimed in claim 29, wherein said attenuating pulse generating means generates said attenuating pulse signal having a pulse width of approximately 5 to 15 lines of a said frame.

39. An apparatus as claimed in any one of claim 17, wherein said inserting means comprises a pulse mixer.

40. An apparatus as claimed in claim 29, wherein said video signal attenuating means comprises a field attenuator.

41. An apparatus as claimed in claim 17 including pulse tip clamping means to clamp tips of said synchronisation pulses to a same voltage level to ensure correct horizontal synchronisation of the treated video signal.

42. An apparatus as claimed in claim 29, wherein said video signal attenuating means adjusts a dc voltage level of a normal blanking level of the video signal throughout an attenuated portion thereof to a level of approximately 0.05 to 0.1 volts towards the synchronisation pulse tip level.

43. An apparatus for decoding a treated video signal comprising a pulse signal and an opposing pulse signal inserted into a horizontal blanking interval of the treated video signal, and synchronization pulses, the apparatus including:

decoder receiving means to receive the treated video signal;

decoder clamping means to clamp a dc voltage of the pulse signal and opposing pulse signal in the treated video signal to a video blanking level; and stabilising means to stabilise synchronisation pulse amplitude.

44. An apparatus as claimed in claim 43, wherein said decoder clamping means is adapted to clamp dc voltages of inserted further pulse signals in the treated video signal to the video blanking level.

45. An apparatus as claimed in claim 43, including:

detecting means to detect an attenuated amplitude of a horizontal synchronisation pulse and corresponding picture information portion of last lines of alternate frames of the treated video signal; and amplifying means to amplify the amplitude of said horizontal synchronisation pulses and corresponding picture information portions to restore same to correct video levels.

46. An apparatus as claimed in claim 43, wherein said stabilising means includes:

sensing means to sense horizontal synchronisation pulse amplitude of the treated video signal, comparator means to compare the horizontal synchronisation pulse amplitude with said video blanking level, and amplitude adjusting means to adjust an amplitude of the treated video signal to maintain the horizontal synchronisation pulse amplitude at a correct level.

47. An apparatus as claimed in claim 43, wherein said decoder receiving means includes a synchronisation pulse separating means to regenerate synchronisation pulses at a line rate of the treated video signal for use as a reference by said decoder clamping means.

48. An apparatus as claimed in claim 43, wherein said decoder clamping means includes:

decoder timing means to delay a clamping operation of said decoder clamping means a prescribed time period after a horizontal synchronisation pulse to coincide with propagation of an opposing pulse signal on the treated video signal, a decoder pulse generating means to generate a control signal for operating the clamping operation of said decoder clamping means after said delay, and a clamping amplifier to clamp a dc voltage level of the treated video signal to the video blanking level for a prescribed time period determined by said control signal.

49. An apparatus as claimed in claim 48, wherein said prescribed time period corresponds with the period of time extending from the commencement of the propagation of said opposing pulse signal on the treated video signal to the end of the propagation of said further pulse signal.

50. An apparatus as claimed in claim 46, wherein said amplitude adjusting means comprises an automatic gain control amplifier controlled by the output of said comparator means so as to correct any gain differences in the treated video signal arising from the detection of gain differences in said synchronisation pulse amplitudes detected by said comparator means.

51. A method as claimed in claim 13, wherein reducing the dc voltages includes at least one of switching and clamping the dc voltages.

52. An apparatus as claimed in claim 19, wherein the opposing pulse generating means comprises a timing means to reference the opposing pulse generating means and the inserting means with respect to the color burst portion.

53. An apparatus as claimed in claim 21 wherein the further pulse generating means comprises a timing means to reference the further pulse generating means and the inserting means with respect to the color burst portion.

54. An apparatus as claimed in claim 19, including a further pulse generating means to generate a further pulse signal of a prescribed magnitude sufficient to cause at least one of the treated video signal to further overcompensate the automatic gain control of the video signal recording system and visual impairment of the reproduced picture information contained in a copy made of the treated video signal by the video recording system when inserted into the video signal, the inserting means being controlled to insert the further pulse signal into lines of the video signal having the pulse signal, sometime after a completion of the color burst portion.

55. An apparatus as claimed in claim 54, further comprising a timing means providing at least one of:

(i) a delay of approximately 1 microsecond from a trailing edge of a horizontal synchronisation pulse before said pulse generating means is triggered to generate said pulse signal;

(ii) a delay of approximately 0.5 microseconds from the trailing edge of said horizontal synchronisation pulse before said opposing pulse generating means is triggered to generate said opposing pulse signal; and (iii) a delay of approximately 5 to 7 microseconds from the trailing edge of said horizontal synchronisation pulse before said further pulse generating means is triggered to generate said further pulse signal.

56. A method as claimed in claim 2, wherein said biasing comprises inserting an opposing pulse signal into a color burst portion of the video signal, the opposing pulse signal being of sufficient magnitude to achieve said offset and maintain a resultant dc voltage level of said colour burst portion of the treated video signal to a dc voltage level of said colour burst portion in an original video signal.

57. A method as claimed in claim 51, wherein said biasing comprises inserting said opposing pulse signal having a width commensurate to a remainder of a back porch of a horizontal synchronisation pulse from a commencement of said color burst portion to a commencement of the picture information portion of the video signal.

58. A method of treating a video signal, to provide a treated video signal which mitigates an ability of a video signal recording system having an automatic gain control for adjusting a level of the video signal to copy an acceptable video signal for displaying therefrom, the method comprising acts of:

receiving a video signal comprising horizontal blanking intervals, each horizontal blanking interval including a horizontal synchronization pulse and a color burst portion;

generating a pulse signal having a magnitude sufficient to cause at least one of the treated video signal to overcompensate the automatic gain control of the video signal recording system and visual impairment of a picture information portion of a copy of the treated video signal when inserted into the video signal; and inserting the pulse signal into a the horizontal blanking interval of selected active picture lines of the video signal after a completion of the color burst portion of the video signal, and after at least a commencement of the picture information portion of the video signal.

59. An apparatus for treating a video signal, to provide a treated video signal, which mitigates an ability of a video signal recording system, having an automatic gain control, to produce an acceptable copy of the treated video signal, the apparatus comprising:

an input to receive the video signal;

a pulse generating circuit to generate a pulse signal having a predetermined magnitude sufficient to cause the treated video signal to overcompensate the automatic gain control of the video signal recording system when inserted into the video signal; and an inserting device, coupled to the input and to the pulse generating circuit, controlled to insert the pulse signal into the video signal during a horizontal blanking interval of a line of the video signal, after a completion of a color burst portion and after at least a commencement of the picture information portion of the video signal, and to insert the pulse signal into a sufficient number of active picture lines of the video signal to cause visual impairment of a picture information portion of a copy the treated video signal.

* * * * *